(12) United States Patent
Parekh et al.

(10) Patent No.: US 7,356,027 B1
(45) Date of Patent: Apr. 8, 2008

(54) APPLICATION DECODING ENGINE FOR COMPUTER NETWORKS

(75) Inventors: Pankaj Parekh, Fremont, CA (US); Sandeep Gupta, Delhi (IN); Vijay Mamtani, New Delhi (IN); Himanshu Deoskar, Delhi (IN)

(73) Assignee: iPolicy Networks Inc., Fremont, CA (US)

( * ) Notice: Subject to any disclaimer, the term of this patent is extended or adjusted under 35 U.S.C. 154(b) by 1046 days.

(21) Appl. No.: 10/264,971

(22) Filed: Oct. 4, 2002

Related U.S. Application Data (63) Continuation-in-part of application No. 09/956,394, filed on Sep. 18, 2001, now Pat. No. 7,120,144.

(51) Int. Cl.
*H04L 12/28* (2006.01)
*H04L 12/56* (2006.01)

(52) U.S. Cl. ............... 370/389; 709/201; 709/213; 709/217; 709/249

(58) Field of Classification Search .............. None
See application file for complete search history.

(56) References Cited

U.S. PATENT DOCUMENTS

| | | | | |
|---|---|---|---|---|
| 5,892,935 | A * | 4/1999 | Adams ................. | 712/207 |
| 6,182,146 | B1 * | 1/2001 | Graham-Cumming, Jr. . | 709/238 |
| 7,039,713 | B1 * | 5/2006 | Van Gunter et al. ........ | 709/229 |
| 7,061,920 | B2 * | 6/2006 | Janko et al. ............. | 370/395.5 |
| 7,096,264 | B2 * | 8/2006 | Bonney et al. ............. | 709/224 |
| 2003/0154399 | A1 * | 8/2003 | Zuk et al. ................. | 713/201 |

\* cited by examiner

*Primary Examiner*—Edan Orgad
*Assistant Examiner*—Blanche Wong
(74) *Attorney, Agent, or Firm*—William L. Botjer (57) ABSTRACT

The present invention essentially comprises a Packet Receiver and a Stream Manager for a computer network. When a stream of packets passes through the present invention, they are received by the Packet Receiver. The Packet Receiver identifies the session to which the packet stream belongs, and passes the packet to the Stream Manager. The Stream Manager identifies the application generating the packet stream by scanning an Application ID Hash Table, which is a table that contains a mapping of destination ports to corresponding applications. Thereafter, it uses a State Machine Execution Engine to execute application decode instructions on the packet stream. The application decode instructions are stored in a table called Expression Action Table, and are generated based on a decode script created by the user for each application. The application decode instructions are chosen by the State Machine Execution Engine based on the current state of an Application Decode State Machine, which is a state machine that keeps track of the application decode process. The results of the State Machine Execution Engine are passed to the Stream Manager, and are stored in tables called Session Cache Table and Application Instance Table. Once the Stream Manager has decoded all the transactions and parameters of the application, the decoded information is sent with the packets in the packet stream.

19 Claims, 12 Drawing Sheets

| Applicati on Decode Engine State | Primary Applicati on ID | Second ary Applicati on ID | Applicati on Instance | State_Eve nt_Tree_P ointer | Session Correlati on Index | Hard Deco de ID | Comma nd ID | Comma Flags |
|---|---|---|---|---|---|---|---|---|
| 1 bit | 2 bytes | 2 bytes | 4 bytes | 4 bytes | 4 bytes | 1 byte | 2 bytes | 7 bits |

Fig. 7

| 803 | 805 | 807 | 809 | 811 | 813 | 815 | 817 | 819 | 821 | 823 | 825 | 827 | 829/831 |
|---|---|---|---|---|---|---|---|---|---|---|---|---|---|
| Next Session Corr Entry | Source Port | Dest Port | Source IP | Dest IP | Protocol | Reserved | Valid | AI Creation Flag | Permanent | Prim App Instance | Prim Session ID | Sec App ID | Next Index | Prev Session Corr Entry |
| 4 bytes | 2 bytes | 2 bytes | 4 bytes | 4 bytes | 1 byte | 5 bits | 1 bit | 1 bit | 1 bit | 4 bytes | 4 bytes | 2 bytes | 4 bytes | 4 bytes |

| No of Operands | Opcode | Operand Type | | | | Operand Value | | | |
|---|---|---|---|---|---|---|---|---|---|
| | | Type1 | Type2 | Type3 | Type4 | Value1 | Value2 | Value3 | Vaue4 |
| 2 | MOV 32 | Pkt_Extn | Offset App-IDTable | | | Offset of primary App-id in ext. | Offest of app-id in appid table | | |
| 2 | BGT16 | Offset of AppInstance | Immediate Value | | | Offset of payload length in AI | 20 | | |
| 1 | RET | StateID | | | | Next State Value | | | |
| 2 | STRCPY | Offset in AI | Stringable | | | Offset of parameter in AI | Constant string table index | | |

FIG. 10

| Opcode type | Opcode | Description |
|---|---|---|
| Arithmetic | ADD8, ADD16, SUB8, SUB32 | Adds/subtracts 8-bit/16 bit/32 bit values identified by 'lh_type' 'lhs_offset' and 'rhs_type'-'rhs_offset'; stores the result in the register identified by 'ResultRegister'. |
| Logical | AND8, OR32 | 8-bit/16 bit/32 bit value identified by 'lhs_type'-'lhs_offset' Anded/ORed with the 8-bit/16 bit/32 bit value identified by 'rhs_type'-'rhs_offset'; result is to be stored in the register identified by 'ResultRegister'. |
| Control | JAND8, JOR32, BEQ16 | Branch to index identified by 'NextIndex', if logical ANDing/Oring/Equal_to operation of 8 bit/16 bit/32 bit value identified by 'lhs_type'-'lhs_offset' and value identified by 'rhs_type'-'rhs_offset' is TRUE. Else execute next row. |
| System | RET | Returns normally if 'lhs_type' is NULL Returns the StateEventTreeIndex, identified in 'lhs_value', if 'lhs_type' is STATE_ID. |
| System | FUNCCALL | Calls function based on index identified in 'lhs_value'. Note: The app decode engine on seeing opcode, will fill return address on to stack, as a last parameter, to enable execution return to instruction next to FUNCCALL instruction. |
| System | MOV8 | Move the 8 bit value identified by 'rhs_type'-'rhs_offset' to the variable identified by 'lhs_type'-'lhs_offset'. |

FIG. 11

| Sec App Instance | Reference Instance Count | Param1 Type and ID | Param Type ID | Param2 Type and ID | Param Type ID | Param3 Type and ID | Param Type ID | Param4 Type and ID | Param Type ID | Param5 Type and ID | Param Type ID | Param6 Type and ID | Param Type ID | Param m1 value | Param m2 value | Param m3 value | Param m4 value | Param m5 value | Param m6 value |
|---|---|---|---|---|---|---|---|---|---|---|---|---|---|---|---|---|---|---|---|
| | | | 32 16 bits bits | | 3 5 bits bits | | 3 5 bits bits | | 3 5 bits bits | | 3 5 bits bits | | 3 5 bits bits | 4 bytes | 4 bytes | 4 bytes | 4 bytes | 4 bytes | 4 bytes |

FIG. 12

APPLICATION DECODING ENGINE FOR COMPUTER NETWORKS

CROSS REFERENCE TO RELATED APPLICATION

This application is a continuation-in-part of U.S. patent application Ser. No. 09/956,394, filed on Sep. 18, 2001 now U.S. Pat. No. 7,120,144.

BACKGROUND

The present invention relates to the field of application analyzers for computer networks. More specifically, the present invention relates to a system and method for decoding packets in a packet stream, to identify the applications generating the packet stream, the transactions of the application, and the parameters of the transactions in real time, at high speeds in the order of Gigabits/sec.

The growing popularity of computer networks such as the Internet has resulted in a large number of applications being deployed on such networks. These applications generate network traffic, which have various Quality of Service (QoS) requirements depending on the nature of the application. That is to say, while applications like Simple Mail Transfer Protocol (SMTP) and Hyper Text Transfer Protocol (HTTP) are sensitive to loss, other applications like Voice over Internet Protocol (VoIP) are sensitive to delay. Similarly, while applications like real-time video conferencing generate high priority traffic that require a minimum guaranteed bandwidth, those like File Transfer Protocol (FTP) generate small bursts of low priority traffic that do not require a minimum guaranteed bandwidth.

To ensure that these varying traffic requirements are met, it is essential for network administrators to have a means to identify the traffic based on the application generating it.

For this purpose, network administrators deploy protocol/application analyzers to identify application traffic. These are devices that capture and decode traffic flowing through the network, and identify the applications generating this traffic. They also provide information about the transactions of an application. For example, analyzers can identify that an HTTP application has transactions like HTTP_GET (fetching an HTML page) and HTTP_PUT (sending data to an HTML page), by analyzing application traffic.

Typical analyzer implementations do not adopt a generic approach to identify application traffic. The application identification algorithm is hard-coded into the analyzer, and decoding newer application traffic requires upgradation of the algorithm. Some implementations do adopt a generic approach, but these are limited to decoding each individual packet of a packet stream independently. Such implementations are therefore slow, and are unable to extract/associate the decoded knowledge across multiple packets, when seen as a stream.

SUMMARY

An object of the present invention is to provide a system and method for decoding packets in a packet stream on a computer network, to identify the primary application generating the packet stream.

Another object of the present invention is to provide a system and method for decoding packets in a packet stream, to identify the secondary application generating the packet stream, in case of tunneled applications.

Yet another object of the present invention is to provide a system and method for decoding packets in a packet stream, to identify the transactions and parameters of the applications generating the packet stream.

Yet another object of the present invention is to provide a system and method for decoding packets in a packet stream such that the decode process is generic in design, and independent of the applications to be decoded.

Yet another object of the present invention is to provide a system and method for decoding packets in a packet stream at real time speeds by efficient use of the already decoded application knowledge.

The present invention is a system and method for decoding packets in a packet stream to identify the applications generating the packet stream, the transactions of the application, and the parameters of the transactions in real time, at high speeds of the order of Gigabits/sec.

The present invention comprises a Packet Receiver and a Stream Manager. When a stream of packets passes through the present invention, they are received by the Packet Receiver. The Packet Receiver identifies the session to which the packet stream belongs, and passes the packet to the Stream Manager. The Stream Manager identifies the application generating the packet stream by scanning an Application ID Hash Table, which is a table that contains a mapping of destination ports to corresponding applications. Thereafter, it uses a State Machine Execution Engine to execute application decode instructions on the packet stream. The application decode instructions are stored in a table called Expression Action Table, and are generated based on a decode script created by the user for each application. The application decode instructions are chosen by the State Machine Execution Engine based on the current state of an Application Decode State Machine, which is a state machine that keeps track of the application decode process. The results of the State Machine Execution Engine are passed to the Stream Manager, and are stored in tables called Session Cache Table and Application Instance Table. Once the Stream Manager has decoded all the transactions and parameters of the application, the decoded information is sent with the packets in the packet stream.

The present invention also takes into consideration new sessions related to existing sessions. When a packet belonging to a new session enters the Stream Manager, the Stream Manager uses a Session Correlation Lookup Engine to determine whether the session of the packet is related to an existing session. If the Session Correlation Lookup Engine determines that the sessions are related, the Stream Manager copies the decoded information from the Session Cache Table and Application Instance Table entries of the existing session to the Session Cache Table and Application Instance Table entries of the new session. In this way, the present invention is able to perform the decode process in real time, at high speeds of the order of Gigabits/sec.

BRIEF DESCRIPTION OF THE DRAWINGS

The preferred embodiments of the invention will hereinafter be described in conjunction with the appended drawings provided to illustrate and not limit the invention, wherein like designations denote like elements, and in which.

DESCRIPTION OF PREFERRED EMBODIMENTS

The present invention is a system and method for decoding packets in a packet stream to identify applications generating the packet stream, transactions of the application, and parameters of the transactions.

The present invention is envisaged to be operating within a Policy Agent. The Policy Agent scans packets as they pass through it, and enforces network policies on these packets. Although the Policy Agent may be variously provided, a description of one such Policy Agent can be found in application Ser. No. 10/052,745 filed on Jan. 17, 2002, and entitled "Architecture for an Integrated Policy Enforcement System"; the entire content of which is hereby incorporated by reference. However, it may be noted that the present invention may be adapted to operate in other Policy Agents by one skilled in the art.

It may also be noted that although the present invention is envisaged to be operating within a Policy Agent, this does not limit the scope of the present invention in any manner. The policy agent may be embodied in a product such as the ipEnforcer 5000® as provided by policy Networks Inc. of Fremont, Calif. This product is used to enforce management policies on networks, and is placed at a point where packets enter a network. Further, the policy agent may be encoded in a programming language such as C or Assembly. The present invention may also be adapted to operate independent of a Policy Agent by one skilled in the art.

The present invention is intended for practice in a network environment, such as a Local Area Network (LAN) environment.

Software programming code, which embodies the present invention, is typically accessed by the microprocessor of workstations or network equipments from storage media of some type, such as a CD-ROM drive or hard drive. Alternatively, the programming code may be embodied in a memory, and accessed by the microprocessor using a bus. The techniques and methods for embodying software programming code in memory, on physical media, and/or distributing software code via networks are well known and will not be further discussed herein.

The preferred embodiments of the present invention will now be discussed with reference to the following figures. In the preferred embodiments, the present invention is implemented as a computer software program. The software may execute on a user's computer; or on a remote computer that may be connected to the user's computer through a LAN. Alternatively, the software may execute on some network equipment, such as a switch or router.

Figure 1:
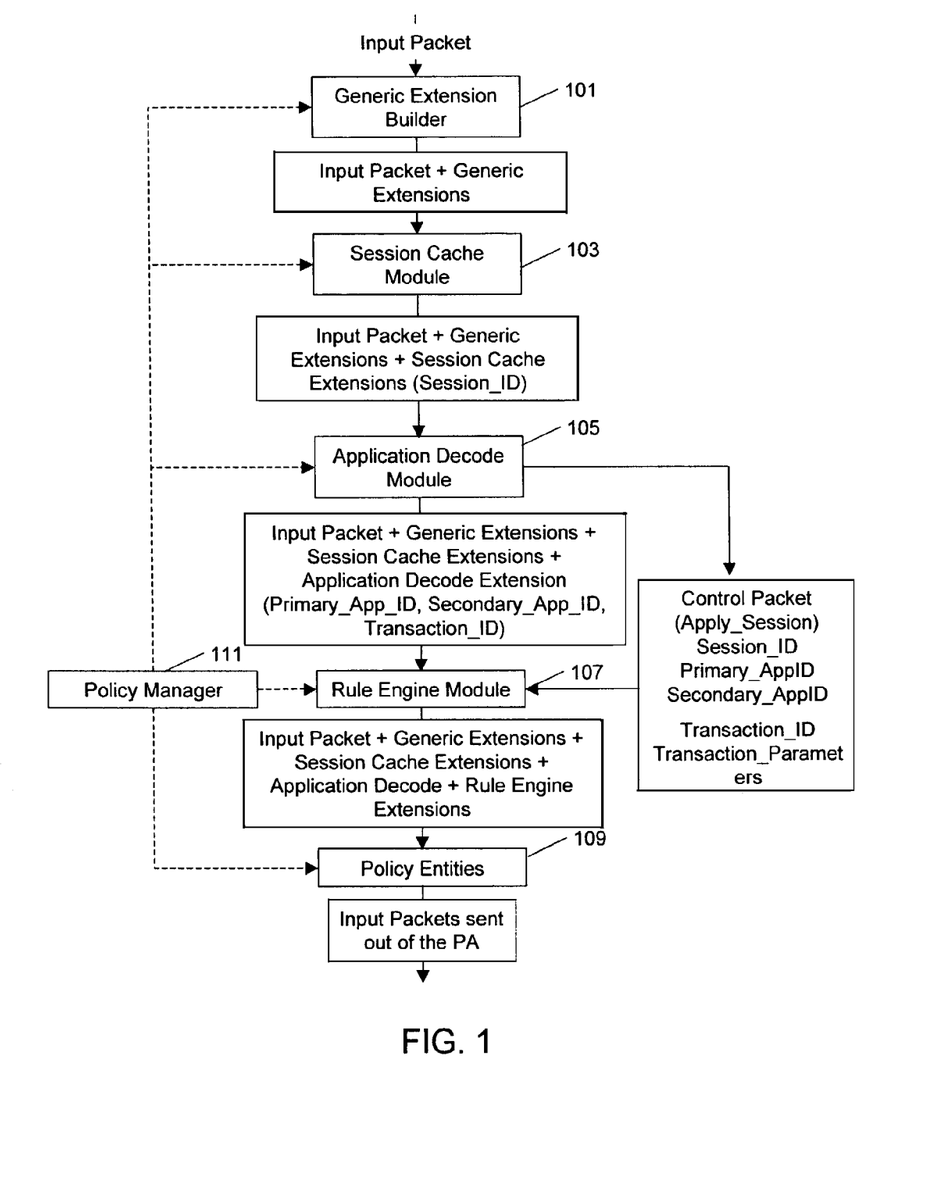
FIG. 1 is a schematic diagram that illustrates the functional modules of an exemplary Policy Agent.

FIG. 1 is a schematic diagram that illustrates the functional modules of the exemplary Policy Agent. Referring to FIG. 1, the various functional modules of the Policy Agent are Generic Extension Builder 101, Session Cache Module 103, Application Decode Module 105, Rule Engine Module 107 and Policy Entities 109. The Policy Agent is also supported by a Policy Manager 111. A packet entering the Policy Agent travels through these functional modules. Each functional module appends its output to extensions in the packet, which are then used by subsequent modules of the Policy Agent.

Generic Extension Builder 101 processes the packet headers for information related to Open Systems Interconnection (OSI) Layer 2 and Layer 3.

Session Cache Module 103 processes the packet headers for information related to OSI Layer 4 and above.

Application Decode Module 105 identifies the application generating the packet and tracks the packet as it transitions from one application state to another. This is the preferred embodiment of the present invention.

Rule Engine Module 107 makes policy decisions based on the information gathered from the previous modules. It identifies partial or complete rule matching and passes this information to Policy Entities 109.

Policy Entities 109 comprise a plurality of policy processing modules that are specific to each individual policy to be enforced. These modules analyze the packet further according to its requirements and enforce policies. Policy processing modules include, but are not limited to, Firewall modules, Intrusion Detection System (IDS) modules, URL Filtering System (URL) modules and Virtual Private Network (VPN) modules.

Policy Manager 111 contains policy rules, which it sends to the Policy Agent for enforcement purposes.

Figure 2:
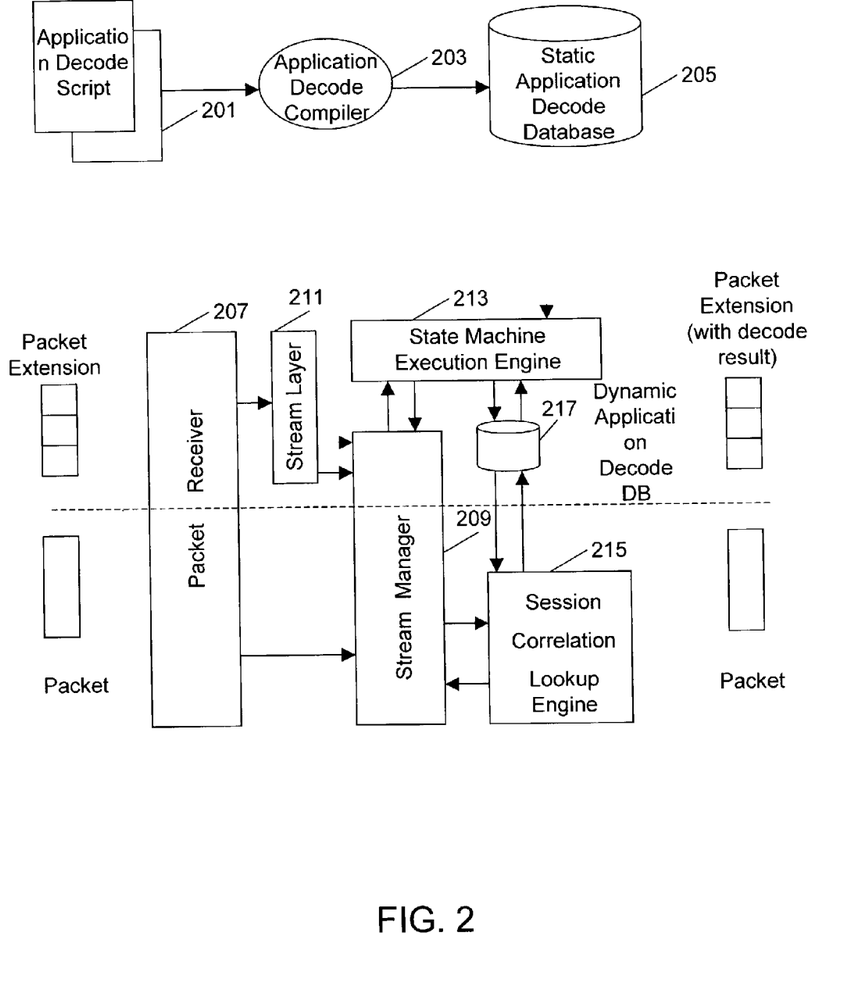
FIG. 2 is a block diagram that illustrates the cooperation amongst the elements of the system, in accordance with the preferred embodiment of the present invention.

FIG. 2 is a block diagram that illustrates the cooperation amongst the elements of the system, in accordance with the preferred embodiment of the present invention. The elements of the system may be grouped into two parts—those operating within the Policy Agent, and those operating within Policy Manager 111. The elements operating within Policy Manager 111 are Application Decode Script 201, Application Decode Compiler 203 and a Static Application Decode Database 205. The elements operating within the Policy Agent are Packet Receiver 207, Stream Manager 209, Stream Layer 211, State Machine Execution Engine 213, Session Correlation Lookup Engine 215 and Dynamic Application Decode Database 217. The inter-working of the parts of Policy Manager 111 is briefly described below.

Application Decode Script 201 defines how an application is to be decoded. It is created by the end user, and is written in a language defined by the present invention.

Application Decode Compiler 203 translates Application Decode Script 201 into Static Application Decode Database 205.

Static Application Decode Database 205 comprises many databases, which are elucidated later. These are downloaded to the Policy Agent for use in the present invention.

The inter-working of the parts of the Policy Agent is discussed in detail in the subsequent figures.

Figure 3:
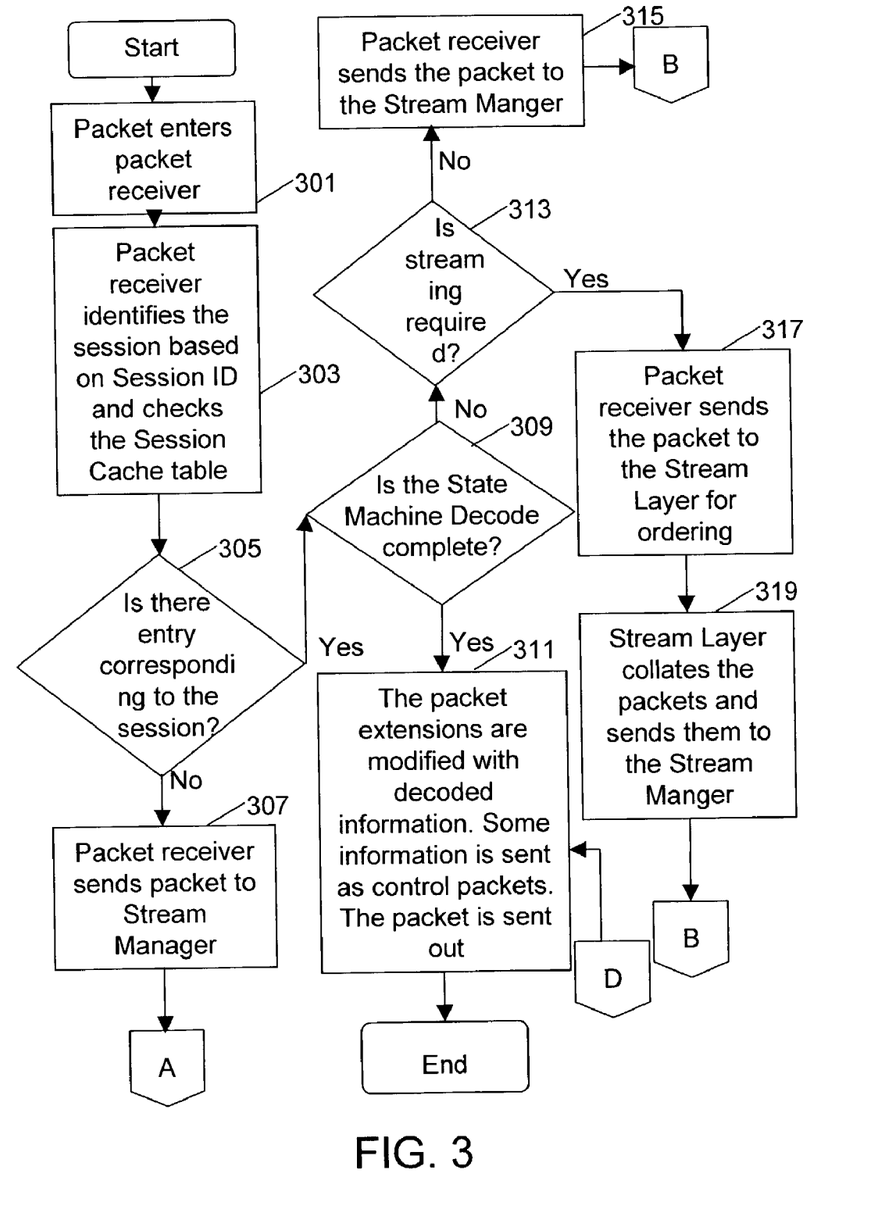
FIG. 3 is a flowchart that illustrates the initial processing steps carried out on a packet by the system, in accordance with the preferred embodiment of the present invention.
Figure 4:
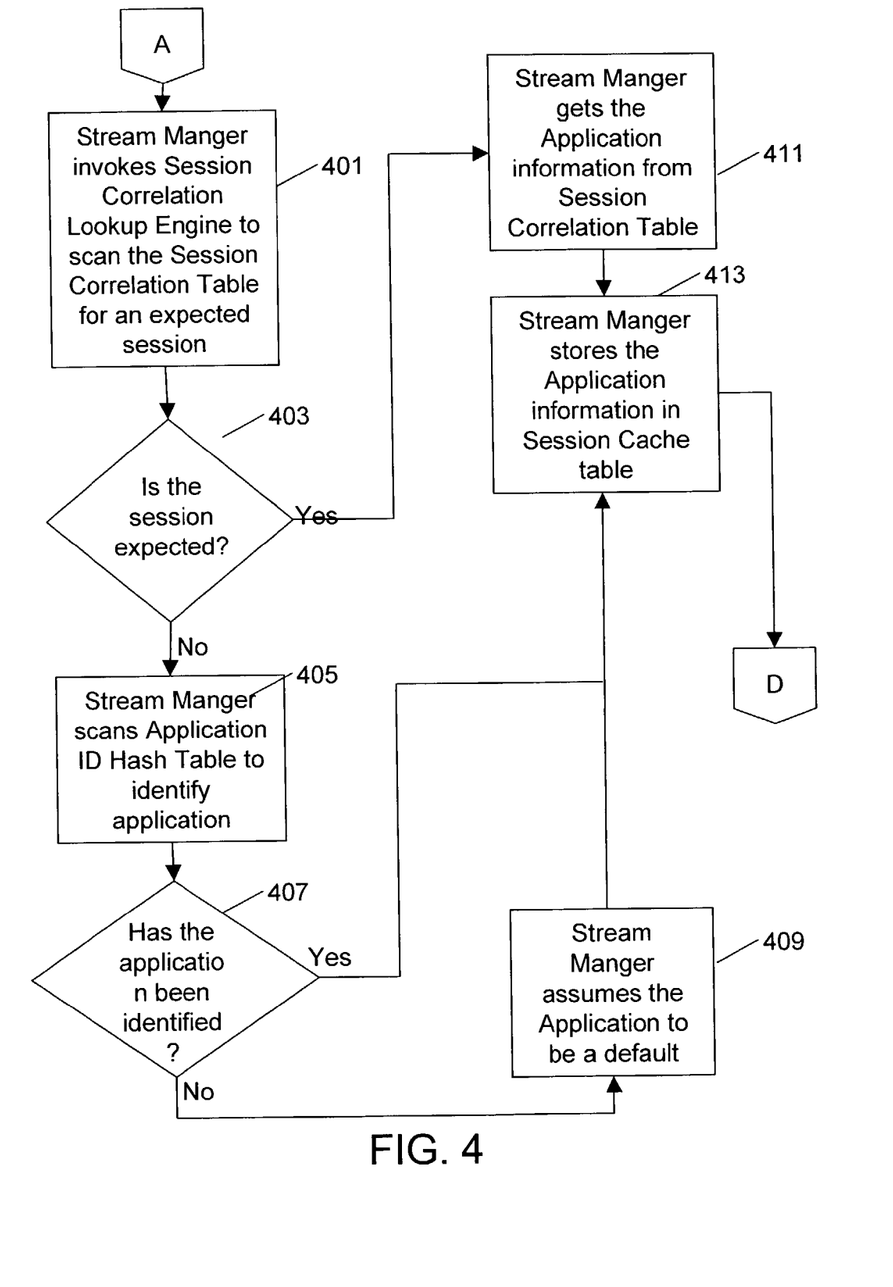
FIG. 4 is a flowchart that illustrates the processing steps carried out on a packet by the system, in accordance with the preferred embodiment of the present invention, if the packet is the first of a session.
Figure 5:
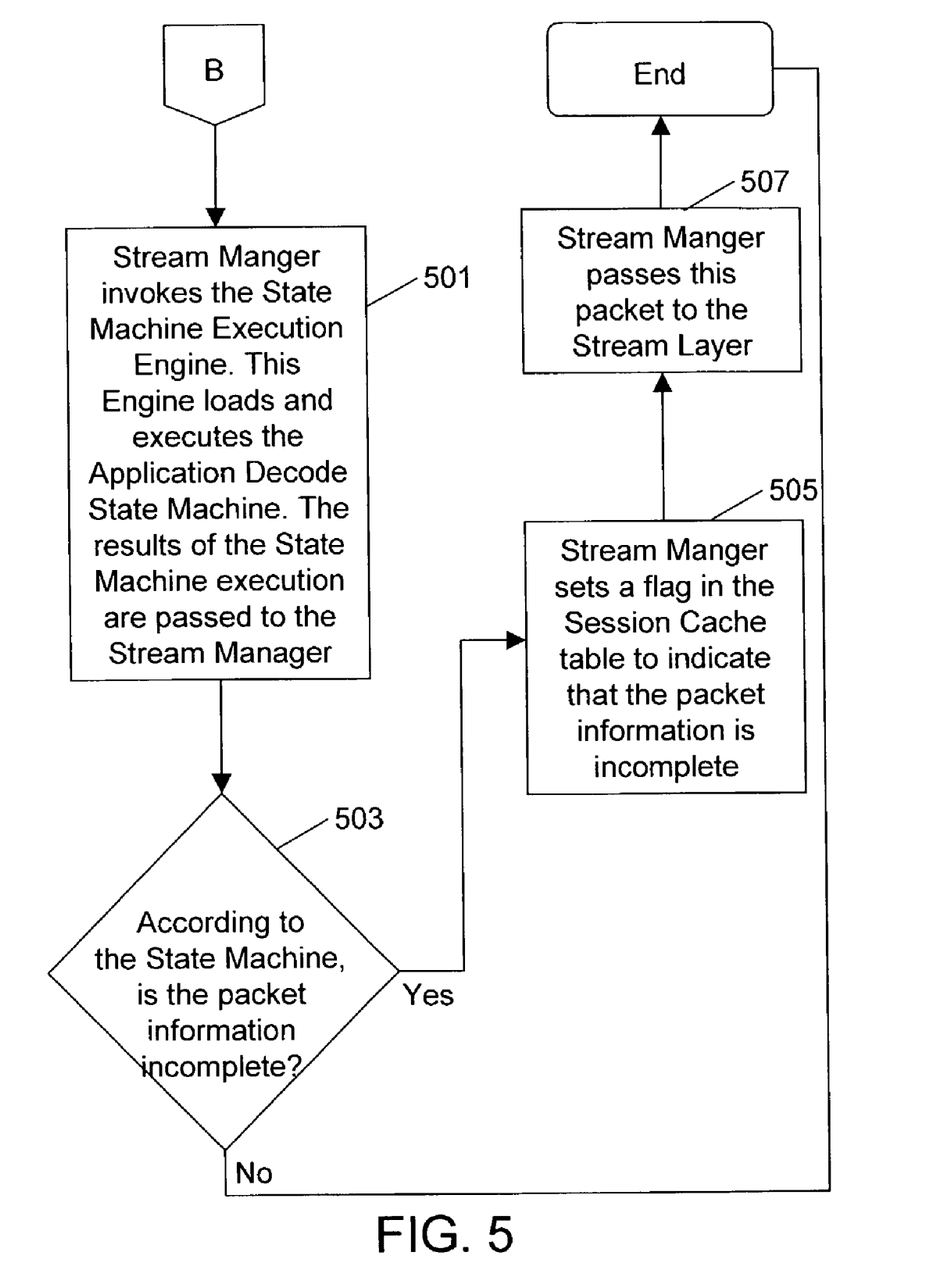
FIG. 5 is a flowchart that illustrates the processing steps carried out on a packet by the system, in accordance with the preferred embodiment of the present invention, if the packet is not the first of a session.

FIGS. 3-5 are flowcharts that illustrate the working of the present invention. FIG. 3 is a flowchart that illustrates the initial processing steps carried out on a packet by the system, in accordance with the preferred embodiment of the present invention. FIG. 4 is a flowchart that illustrates the processing steps carried out on a packet by the system, in accordance with the preferred embodiment of the present invention, if the packet is the first packet of a session. A session is defined as a series of interactions between two communication end points that occur during the span of a single connection. FIG. 5 is a flowchart that illustrates the processing steps carried out on a packet by the system, in accordance with the preferred embodiment of the present invention, if the packet is not the first packet of a session. The steps of the flowchart are described below.

At 301, when the packet enters the present invention, it is received by Packet Receiver 207.

At 303, Packet Receiver 207 identifies the session to which the packet belongs, by scanning the packet extensions of the packet and extracting the session ID. The session ID is appended by Session Cache Module 103, and identifies the session to which the packet belongs.

At 305, Packet Receiver 207 determines whether the packet is the first of a session, or whether it is part of an existing session. This is determined by scanning Session Cache Table 701, which is a table that contains information on currently active sessions.

At 307, if the packet is the first of a session, Packet Receiver 207 sends the packet to Stream Manager 209.

At 401, Stream Manager 209 uses Session Correlation Lookup Engine 215 to determine whether the session is related to an existing session.

At 403, Session Correlation Lookup Engine 215 scans a Session Correlation Table 801 to determine whether the session is related to an existing session.

At 411, if Stream Manager 209 determines that the session is related to an existing session, it collects the already decoded application knowledge from Session Correlation Table 801.

At 413, Stream Manager 209 stores the information collected from Session Correlation Table 801 in Session Cache Table 701.

At 311, the Stream Manager 209 modifies the packet extensions with decoded information from Session Cache Table 701. This ends the flow of control for packets of a session related to an existing session.

Referring again to 403, if Stream Manager 209 determines that the session is not related to an existing session then at 405, Stream Manager scans Application ID Hash Table 901 and Application ID Table 919 to identify the application. These tables contain a mapping of destination port numbers to applications.

At 407, Stream Manager 209 determines whether it has been able to identify the application from Application ID Hash Table 901 and Application ID Table 919.

At 413, if the application has been identified, Stream Manager 209 stores this information in Session Cache Table 701.

At 409, if the application has not been identified, Stream Manager 209 assumes a default application, and at 413, stores this information in Session Cache Table 701.

At 311, Stream Manager 209 modifies the packet extensions with the decoded information. This ends the flow of control for packets of a session not related to an existing session.

The decode steps for the first packet of a session are thus completed.

Referring again to FIG. 3, at 309, if the packet is part of an existing session, Packet Receiver 207 determines whether decode of the Application Decode State Machine is complete. The Application Decode State Machine keeps track of the decode process. If the Application Decode State Machine is complete, further decode is not required; the packet extensions can be modified with the decoded information. Thus, at 311, if the decode of the State Machine is complete, the Packet Receiver modifies the packet extensions with the decoded information and sends the packet out of the Policy Agent.

At 313, if the Application Decode State Machine is not complete, Packet Receiver 207 determines whether any streaming action is required for the packet. Streaming is required in case Application Decode Script 201 specifies that special treatment is necessary for Transmission Control Protocol (TCP) packets. This special treatment involves taking care of re-transmitted packets and out-of-order packets. Streaming is also required if Session Cache Table 701 has a flag set at 505.

At 315, if Packet Receiver 207 determines that streaming is not required, it sends the packet to Stream Manager 209.

At 317, if Packet Receiver 207 determines that streaming is required, it sends the packet to Stream Layer 211 for ordering. At 319, Stream Layer 211 collates the packets and sends them to Stream Manager 209.

At 501, Stream Manager 209 invokes State Machine Execution Engine 213, and loads and executes the Application Decode State Machine. The working of State Machine Execution Engine 213 is elaborated in FIG. 6. The results of State Machine Execution Engine 213 are passed to Stream Manager 209.

At 503, Stream Manager 209 determines whether the information in the packet was sufficient for State Machine Execution Engine 213 to process the packet.

At 505, if Stream Manager 209 determines that the information in the packet was not sufficient, it sets a flag in Session Cache Table 701. Then, at 507, Stream Manager 209 passes the packet to Stream Layer 211. Stream Layer 211 waits until it gets the remaining packets, after which it collates the information, and presents the same to Stream Manager 209. This process is called streaming, and is illustrated at 317 and 319.

At 503, if Stream Manager 209 determines that the packet information is complete, the packet is sent out of the Policy Agent.

Figure 6:
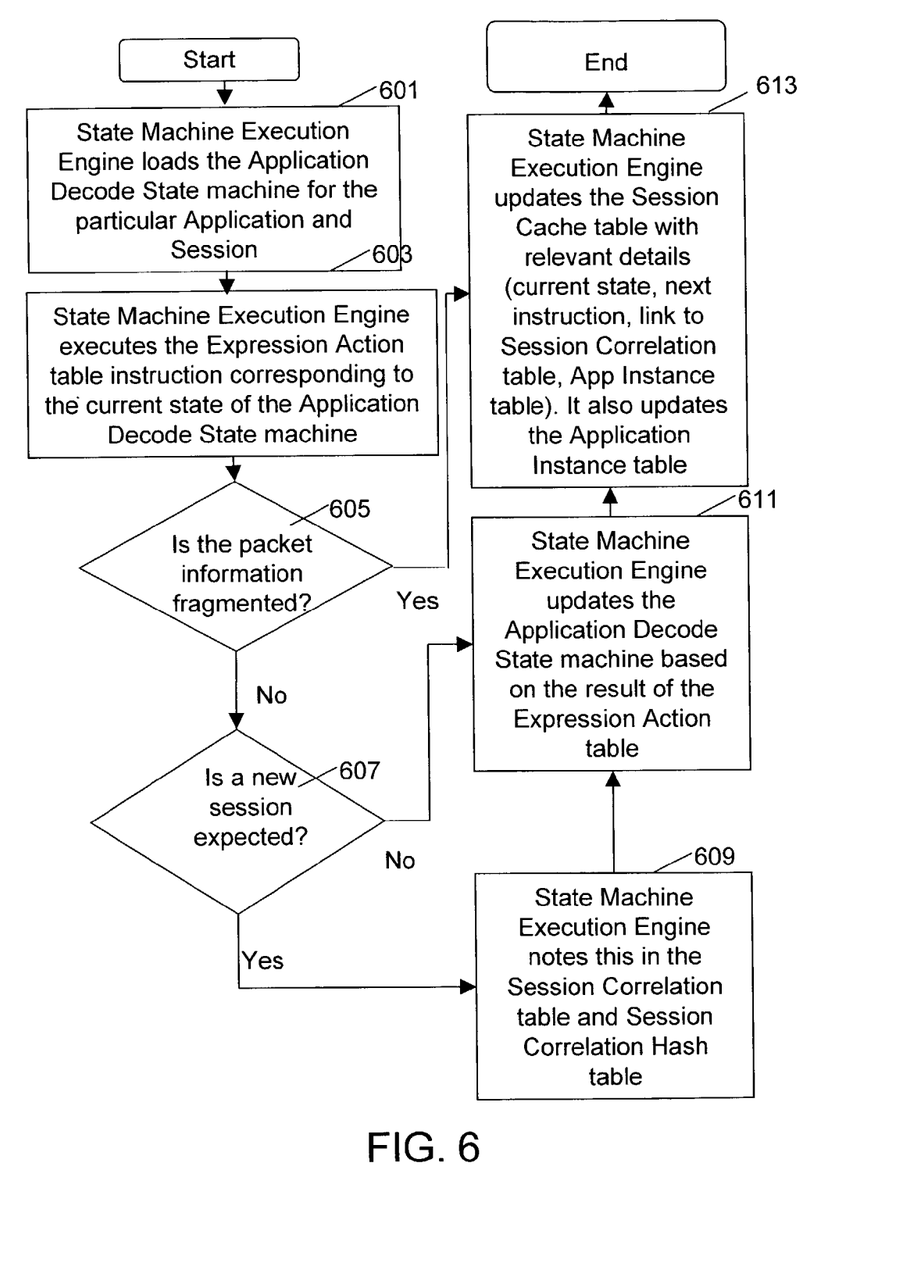
FIG. 6 is a flowchart that illustrates the working of the State Machine Execution Engine of the system, in accordance with the preferred embodiment of the present invention.

FIG. 6 is a flowchart that illustrates the working of State Machine Execution Engine 213 in the system, in accordance with the preferred embodiment of the present invention. State Machine Execution Engine 213 executes the Application Decode State Machine. The Application Decode State Machine keeps track of the state of the decode process. Each state has a set of instructions that are to be executed, and State Machine Execution Engine 213 executes these instructions.

At 601, State Machine Execution Engine 213 loads the Application Decode State Machine, to determine the state of decode that has been reached for the particular application and session.

At 603, State Machine Execution Engine 213 looks up Expression Action Table 1001 for instructions to be executed corresponding to the state of the Application Decode State Machine.

At 605, State Machine Execution Engine 213 determines whether the information available in the packet is sufficient to complete the instructions. At 605, if the information available in the packet is not sufficient to complete the instructions, State Machine Execution Engine 213 does not carry out the decode process. This process continues at 503.

At 607, if the information available in the packet is sufficient to complete the instructions, State Machine Execution Engine 213 determines whether the current decode state indicates that a new session is expected.

At 611, if the current decode state indicates that a new session is not expected, State Machine Execution Engine 213 updates the Application Decode State Machine accordingly.

At 613, State Machine Execution Engine 213 updates Session Cache Table 701 and Application Instance Table 1201.

At 609, if the current decode state indicates that a new session is expected, State Machine Execution Engine 213 notes this information in Session Correlation Table 801 and Session Correlation Hash Table.

At 611, State Machine Execution Engine 213 updates the Application Decode State Machine accordingly.

At 613, State Machine Execution Engine 213 updates Session Cache Table 701 and Application Instance Table 1201.

Figure 7:
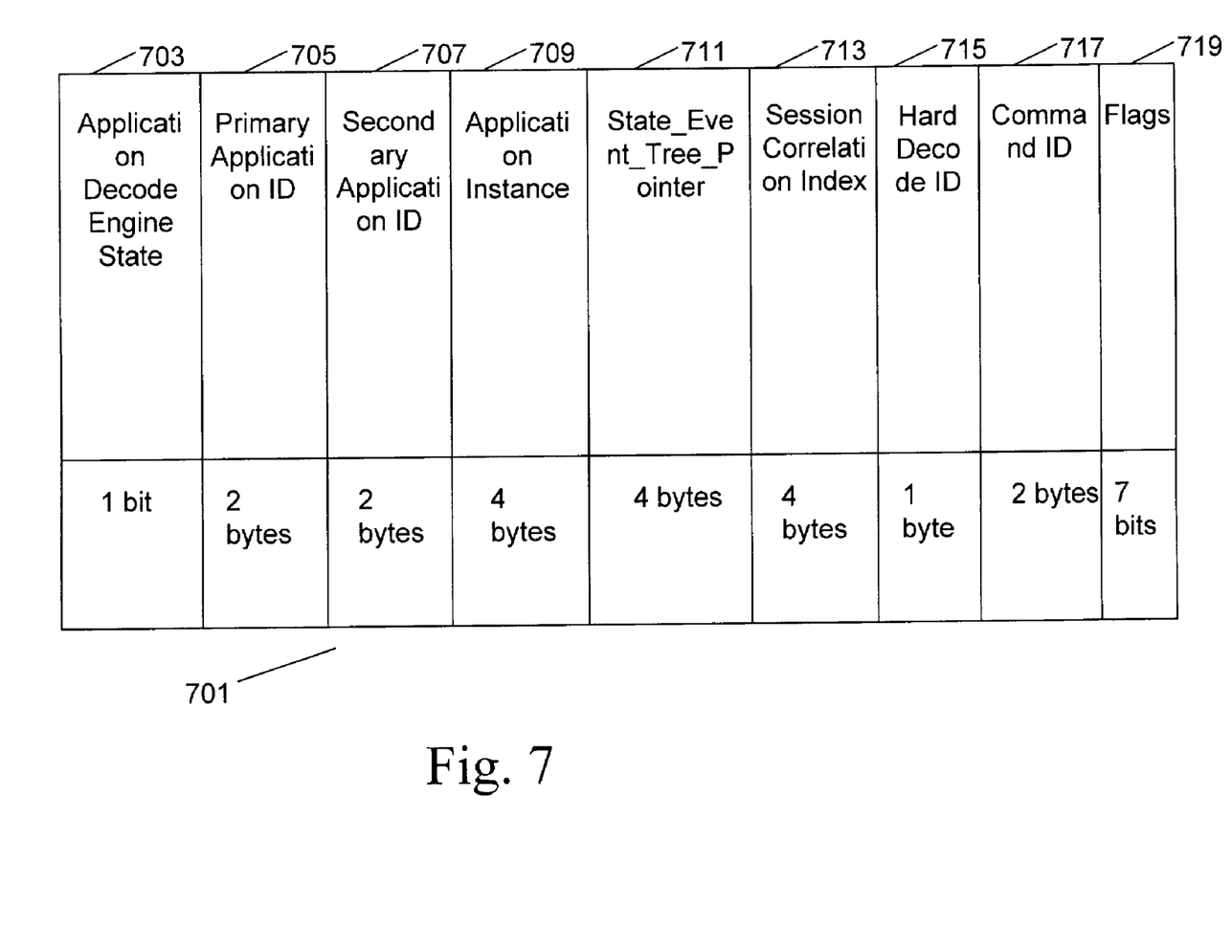
FIG. 7 is a diagram illustrating the structure of the Session Cache Table.

FIG. 7 is a diagram illustrating the structure of Session Cache Table 701. This table maintains session specific information across packets, and is made up of nine columns. Referring to FIG. 7, these columns are described below.

"Application Decode Engine State" 703 stores the Application Decode State Machine's state for each session. This field can have either "COPY" or "DECODE" values. The default value of this field is "DECODE", and this value can be changed to "COPY" through Application Decode Script 201. If the value of this field is "COPY", Stream Manager 209 will copy the values in the Primary Application ID 705, Secondary Application ID 707 and Command ID 717 fields onto the packet extensions.

"Primary Application ID" 705 identifies the application is running corresponding to the session entry. In case this session is correlated to an existing session, this field identifies the primary application-id, for which this correlated session was created. In case two applications (Primary and Secondary application), for the case of tunneled applications, run on the same session, this field identifies the primary application.

"Second Application ID" 707 identifies the Secondary Application running corresponding to the session entry. In case this session is correlated to an existing session, this field gives an Application ID for this correlated session. In the case of tunneled applications, this field gives the Application ID for the tunneled application. If the session is neither a correlated session, nor a session for a tunneled application, the field contains the default entry "0xFF".

"Application Instance" 709 is an index into an entry in Application Instance Table 1201. Application Instance Table 1201 is elucidated in FIG. 12.

"State_Event_Tree_Pointer" 711 identifies the starting point in Expression Action Table 1001 corresponding to the current state of the Application Decode State Machine. Initially, this field is filled from Application ID Table 919 and Application ID Hash Table 901, and subsequently it is updated during the execution of the Application Decode State Machine.

"Session Correlation Index" 713 is an index into an entry in Session Correlation Table 801, of the Secondary Application or Primary Application, as the case may be.

"Hard Decode ID" 715 is used for applications that cannot be coded through Expression Action Table 1001 or Application Decode Script 201, or for performance reasons, the application decode is added as assembly code assembled along with the Application Decode Engine. This field identifies these applications by an ID.

"Command ID" 717 identifies the command that is being executed for the session. The appropriate values for this field are defined in Application Decode Script 201.

"Flags" 719 indicate whether streaming is required or not. Streaming is required if Application Decode Script 201 specifies that Stream Manager 209 should treat TCP and UDP packets separately; or if State Machine Execution Engine 213 is unable to process a packet because the information in the packet is incomplete at 503. Stream Manager 209 sets this field.

Figure 8:
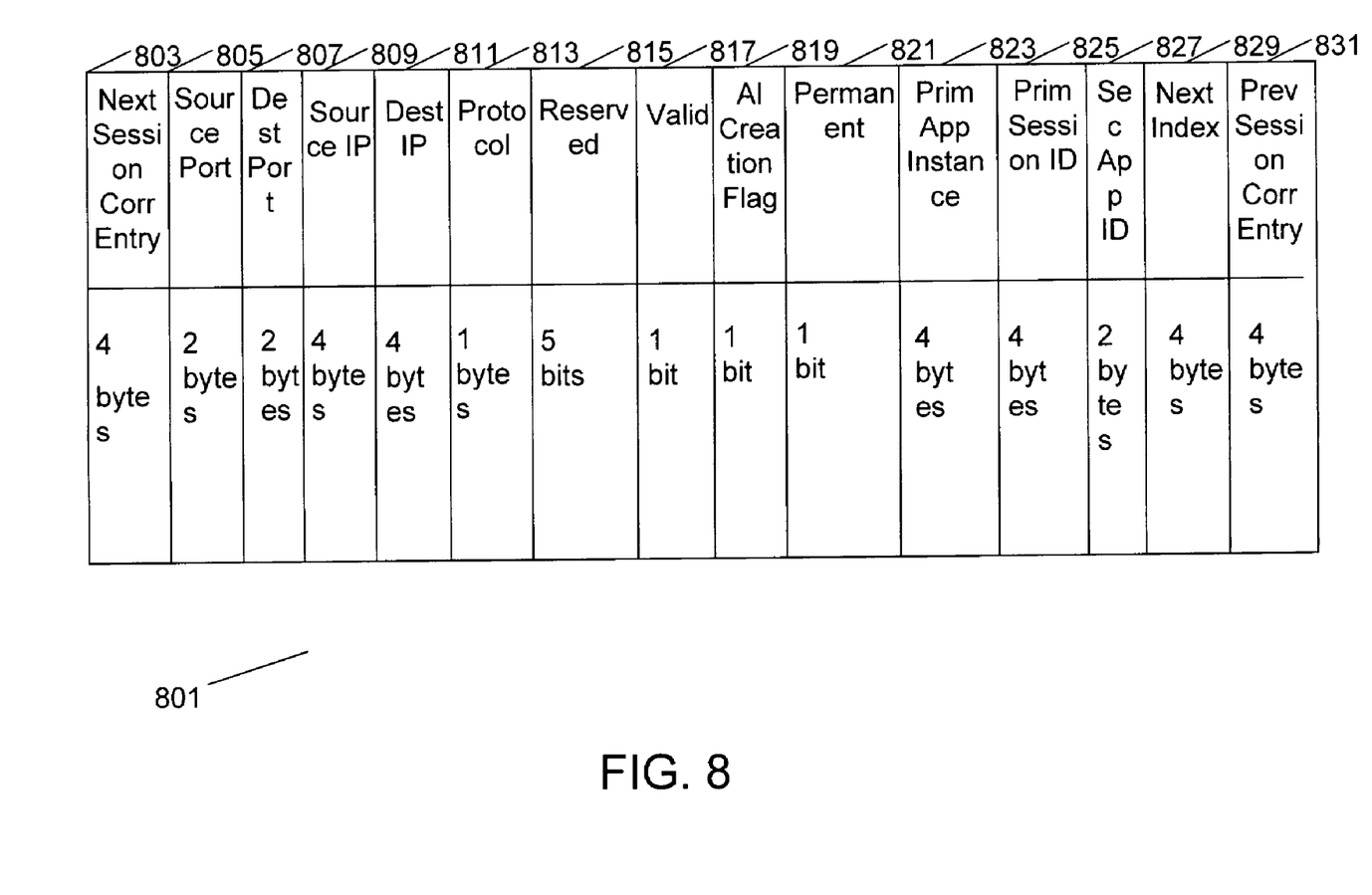
FIG. 8 is a diagram illustrating the structure of the Session Correlation Table.

FIG. 8 is a diagram illustrating the structure of Session Correlation Table 801. Session Correlation Table 801 maintains information specific to expected session across packets. To improve the efficiency of Session Correlation Table 801, it is supported by a hash table called the Session Correlation Hash Table. Session Correlation Table 801 is made up of fifteen columns. Referring to FIG. 8, these columns are described below.

"Next Session Corr Entry" 803 is a pointer to the next Session Correlation entry. This is used for traversal when the same Hash index is obtained for multiple Session Correlation entries.

"Source Port" 805 identifies the source port of the expected session. If the source port number is not relevant, this field is left empty.

"Dest Port" 807 identifies the destination port for the expected session. This is the field on which the Hash lookup is done, and thus is never left empty.

"Source IP" 809 identifies the IP address of the expected session. If the source IP is not relevant, this field is left empty.

"Dest IP" 811 identifies the destination IP address for the expected session. If the destination IP is not relevant, this field is left empty.

"Protocol" 813 identifies the Layer 4 protocol of the expected session.

"Reserved" 815 is a reserved field. These are 5 bits that are left unused for future use.

"Valid" 817 identifies whether the entry is in use or not. Stream Manager 209 checks this field while creating a new entry in Session Correlation Table 801.

"AI Creation Flag" 819 indicates whether the Secondary Application Instance needs to create a new Application Instance Table 1201 entry or whether the Secondary Application Instance can use the same Application Instance Table 1201 entry as the Primary Application. This field is useful for applications with correlated sessions, to indicate if the two sessions need separate Application Instance entries or for the tunneled applications on the same session. The Primary Application Instance fills this field.

"Permanent" flag 821 indicates when the entry in Session Correlation Table 801 is to be removed. If this flag is "True", the entry is removed when the Primary Application Instance is removed. If this flag is "False", the entry is removed when the first packet of the Secondary Application Instance arrives. Essentially, this flag indicates whether the entry should exist for the lifetime of the Primary Application Instance, or whether it should be removed when the Secondary Application Instance starts. This flag is useful in case of correlated sessions.

Correlated sessions are two different sessions that are part of same application. For example, in HTTP applications, the request and response are parts of the same TCP session, and the application ends after the sessions are over. But in the case of FTP applications, the request for transfer of a file takes place in one session, and in that session, the next (correlated) TCP session in which the actual file transfer would take place is negotiated and agreed upon by the two ends. Subsequently, a new TCP session is then opened for the actual file transfer. Typically, in applications like FTP, the master session exchange details of the subsequent session (correlated session) in which other part of the application work would be done. In some cases, like in FTP, this exchange of specifics about new session is done for each correlated session. Thus, the session correlation information has a lifetime of one session only. On the other hand, in applications like H323, the exchange of correlated session information has a lifetime of the time while the primary session is alive. The flag indicates this fact about the correlated session.

"Prim App Instance" 823 indicates the Primary Application Instance of the primary session which created this entry.

"Prim Session ID" 825 indicates the primary session of the Primary Application Instance that created this entry.

"Sec App ID" 827 indicates the Secondary Application for which this entry is created.

"Next Index" 829 indicates the next Session Correlation Table 801 entry corresponding to the Primary Application Instance of this entry. A single primary session can have multiple correlated sessions. For example, in H323 many correlated sessions, for audio, video, data etc may be established. When the primary session closes, or is killed, all the related correlated sessions need to be cleaned up. "Next Index" is a linked list of the correlated entries created for a primary session.

"Prev Session Corr Entry" 831 a pointer to the previous Session Correlation entry. This is used for deleting a Session Correlation Table 801 entry from a list of Session Correlation Table 801 entries that have the same Hash index.

Figure 9:
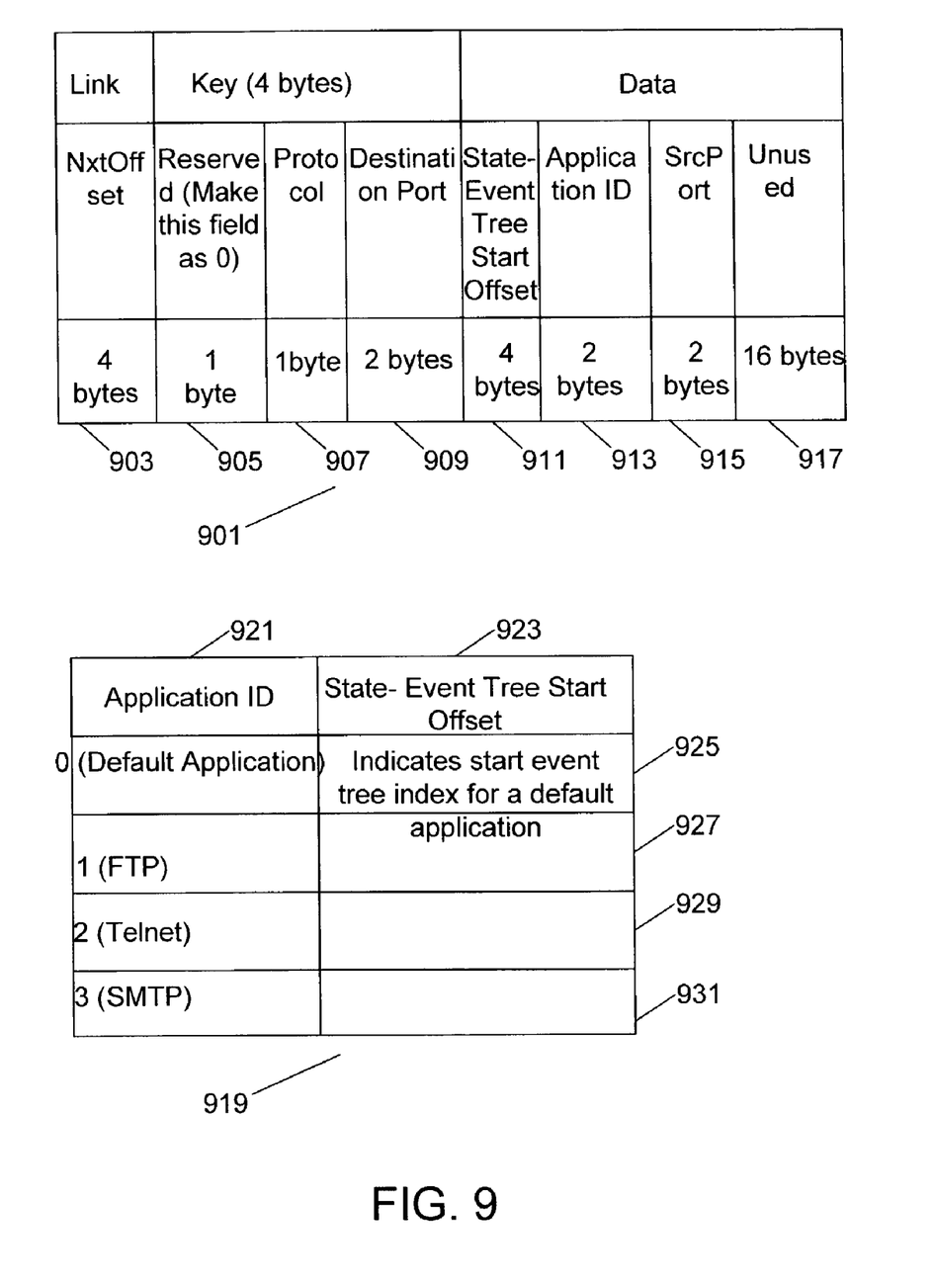
FIG. 9 is a diagram illustrating the structure of the Application ID Hash Table and Application ID Table.

FIG. 9 is a diagram illustrating the structure of Application ID Hash Table 901 and Application ID Table 919. These tables are created by Application Decode Compiler 203 while compiling Application Decode Script 201, and are a part of Static Application Decode Database 205. Application ID Hash Table 901 has eight columns. Referring to FIG. 9, these columns are described below.

"NxtOffset" 903 indicates the next entry in Application ID Hash Table 901, which has the same Hash index after hashing on the Destination Port.

"Reserved" 905 is a reserved field. It is reserved for future use.

"Protocol" 907 identifies the Layer 4 protocol of the Application.

"Destination Port" 909 identifies the destination port of the Application. This is the field on which the Hash lookup is done, and thus is never left empty.

"State-Event Tree Start offset" 911 identifies the starting point in Expression Action Table 1001.

"Application ID" 913 is a unique identifier generated by Application Decode Compiler 2 03 for each application supported by the present invention.

"SrcPort" 915 identifies the source port of application. This field is left empty if the port number is not relevant.

"Unused" 917 is an unused field. It is reserved for future use, to include more information per application when required.

Application ID Table 919 has two columns. Referring to FIG. 9, these columns are briefly described below.

"Application ID" 921 is a unique identifier generated by Application Decode Compiler 203 for each application supported by the present invention. Application ID Table 919 is indexed on this field.

"State-Event Tree Start offset" 923 identifies the starting point in Expression Action Table 1001.

Figure 10:
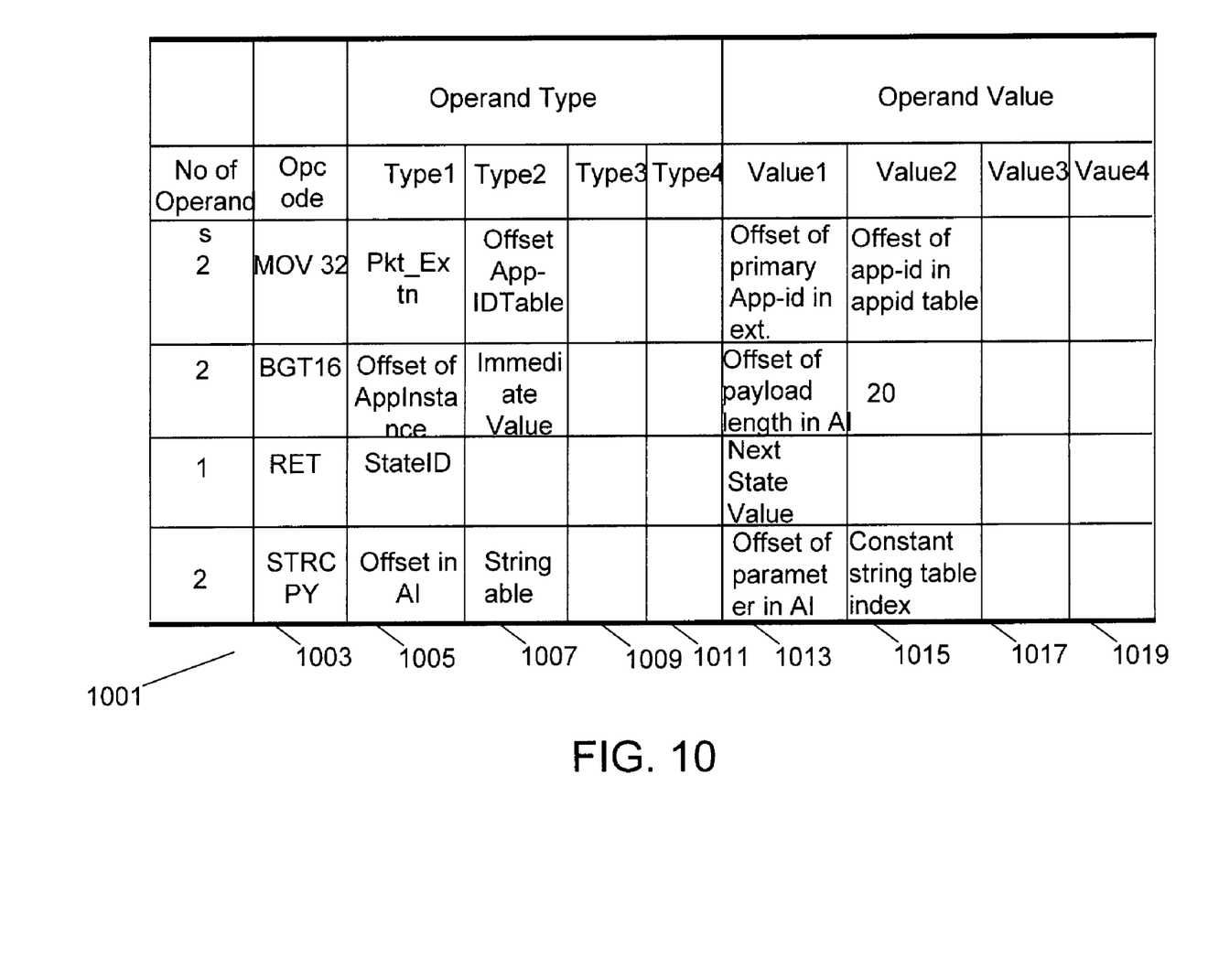
FIG. 10 is a diagram that illustrates a sample set of Expression Action Table entries.

FIG. 10 is a diagram that illustrates a sample set of Expression Action Table 1001 entries. This table is created by Application Decode Compiler 203 while compiling Application Decode Script 201, and is a part of Static Application Decode Database 205.

Each entry of Expression Action Table 1001 identifies an instruction that is to be performed during the Application Decode State Machine execution. These instructions are atomic expressions, which have one opcode and a maximum of eight operands.

Each entry of the Expression Action Table 1001 may have ten or eighteen columns. The operations that require four or less parameters need only first ten columns. FIG. 10 illustrates an example of these operations. There are other operations that need more than four parameters. These operations have eight additional fields namely Operand Type 5 to Operand Type 8 and Operand Value 5 to Operand Value 8. Referring to FIG. 10, the columns of this table are briefly discussed below.

"Opcode" 1003 is an identifier that defines how an instruction is to be executed. The Opcode 1003 either denotes an action (such as moving/copying a value from one location to another) or denotes an operation (such as adding/subtracting two values).

"Operand Type 1" 1005 to "Operand Type 4" 1011 identify the type of the operands.

"Operand Value 1" 1013 to "Operand Value 4" 1019 identify the value of the operands.

Figure 11:
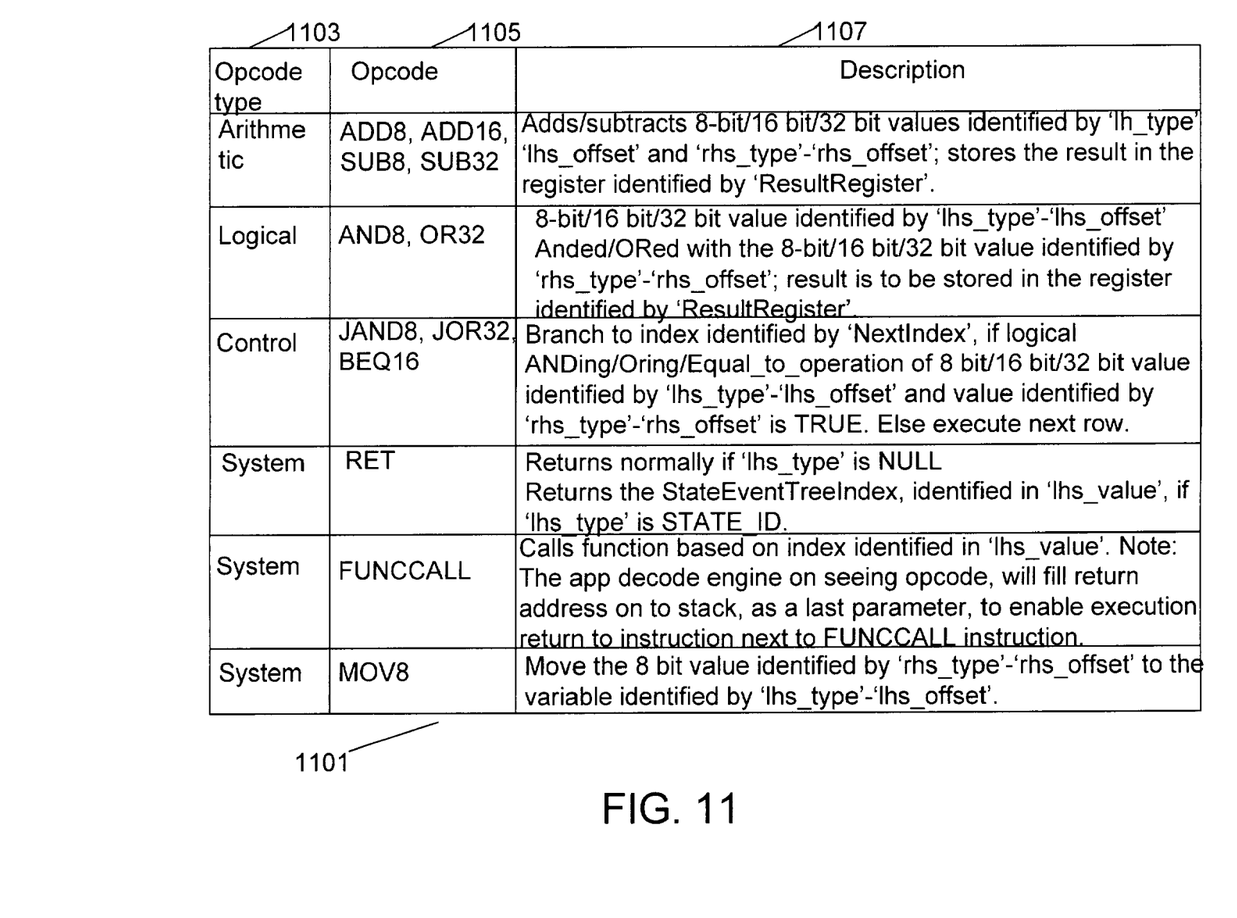
FIG. 11 is a diagram that describes some of the opcodes supported by the State Machine Execution Engine.

FIG. 11 is a diagram that describes some of the instructions supported by State Machine Execution Engine 213. The table shows sample opcodes along with a brief description of their function. This table is not intended to be an exhaustive listing of all opcodes supported by State Machine Execution Engine 213.

Figure 12:
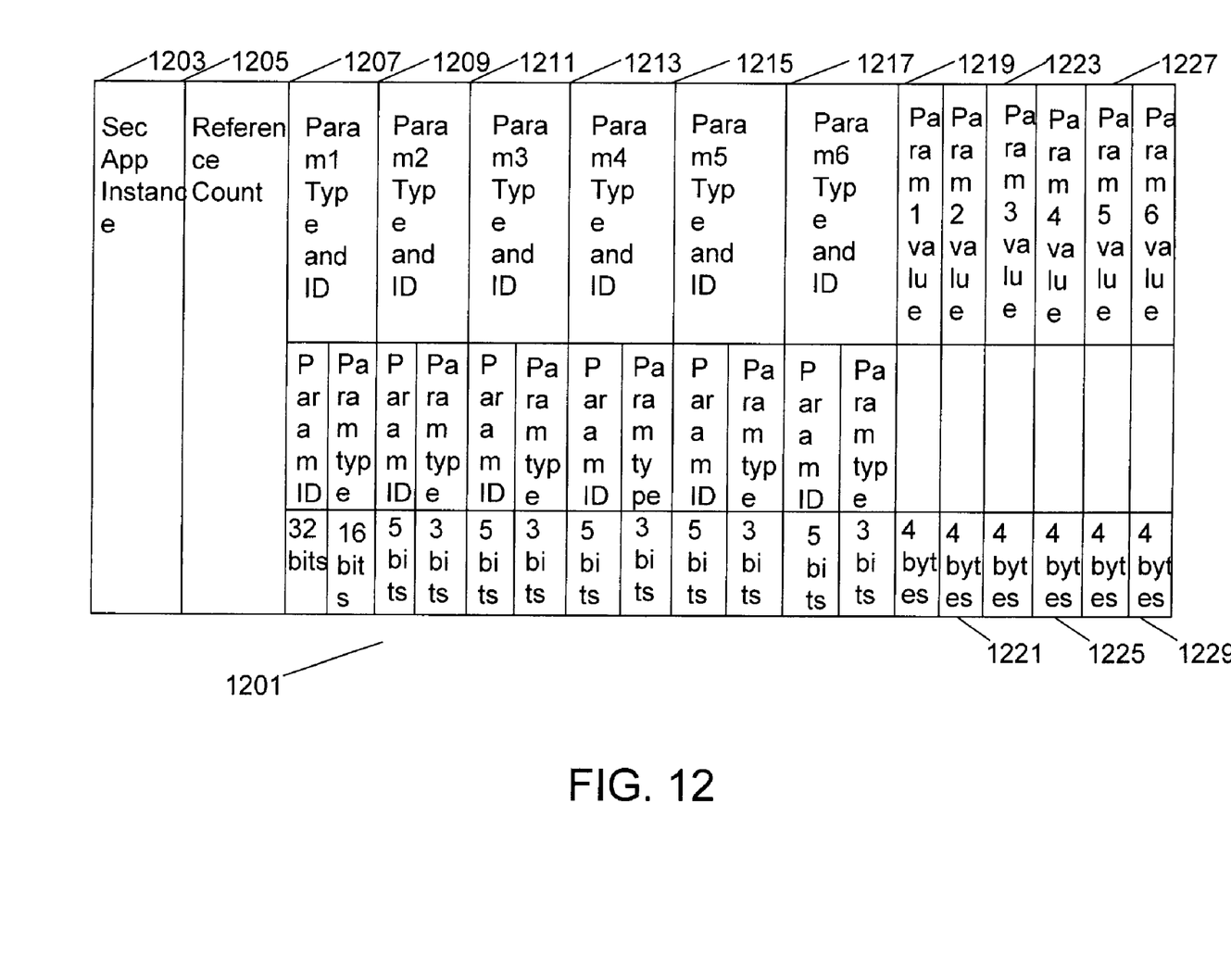
FIG. 12 is a diagram that illustrates the structure of the Application Instance Table.

FIG. 12 is a diagram that illustrates the structure of Application Instance Table 1201. This table contains information specific to each instance of an application. Entries in this table are referred to by Session Cache Table 701. Application Instance Table 1201 has fourteen columns. Referring to FIG. 12, these columns are discussed below.

"Sec App Instance" 1203 is a pointer to Application Instance Table 1201 entry for the Secondary Application Instance. This field is used only for applications with correlated sessions and for tunneled applications.

"Reference Count" 1205 identifies the number of sessions referring to the entry. When the "Reference Count" is zero, the entry is deleted.

"Param 1 Type and ID" 1207 to "Param 6 Type and ID" 1217 identify the type and ID of the extracted parameters 1 to 6. The parameter type can be of type Integer or String. The parameter ID identifies the parameter. It may be noted that when the present invention operates within the exemplary Policy Agent of FIG. 1, the parameter ID is sent to Rule Engine 107 along with the parameter value so that Rule Engine 107 can apply rules based on the ID and its corresponding value.

"Param 1 value" 1219 to "Param 6 value" 1227 identifies the extracted value of parameters 1 to 6.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention as described in the claims.

What is claimed is:

1. A system for decoding the packet streams of computer networks and identifying applications generating the packet streams, the system comprising:
   a. a plurality of static data stores containing instructions for decoding a packet to identify the application, transactions and parameters, wherein said plurality of static data stores further comprise:
      i) an Application ID Hash Table that contains a mapping of destination port numbers to corresponding applications; and
      ii) an Expression Action Table that contains instructions to be executed on the packets for decoding;
   b. a plurality of dynamic data stores for maintaining information related to the current state of the decode process, wherein said dynamic data stores includes:
      i) a Session Cache Table that contains information regarding the currently active sessions;
      ii) an Application Instance Table that contains information regarding the current state of the decode process for the currently active applications; and
      iii) a Session Correlation Table that maintains information regarding news sessions that are related to currently active sessions;
   c. a means for receiving packets and for identifying the session to which the packets belong; and
   d. a means for decoding transactions and parameters of the application and for sending the decoded information with the packet out of the system.

2. The system according to claim 1, wherein said means for receiving packets and for identifying the session is a Packet Receiver.

3. The system according to claim 2, wherein said Packet Receiver checks the Session Cache Table to determine whether the packet is part of an existing session.

4. The system according to claim 1, wherein the system is embodied as a computer program.

5. A method for decoding the packet streams on computer networks and identifying applications generating the packet streams, the method comprising steps of:
   a. identifying the session to which the packet belongs, by means of a Packet Receiver;
   b. identifying the application generating the packet, if the session is a new session, by sending the packet to a Stream Manager;
   c. identifying the transactions and parameters of the application generating the packet, if the session is an existing session, by sending the packet to a Stream Manager;
   d. identifying the application using a Session Correlation Lookup Engine, if the session to which the packet belongs is an expected session;
   e. identifying the application using an Application ID Hash Table, if the session to which the packet belongs is not an expected session; and
   f. storing the identified application details in a Session Cache Table and an Application Instance Table, by the Stream Manager.

6. The method according to claim 5, wherein the step of identifying the application using the Session Correlation Lookup Engine further comprises scanning a Session Correlation Lookup Table based on destination port of the packet to determine if the session is an expected session.

7. The method according to claim 5, wherein the step of identifying the application using the Application ID Hash Table further comprises scanning the Application ID Hash Table based on the destination port of the packet to identify the application.

8. The method according to claim 5, wherein the step of storing the identified application details further comprises the steps of storing a default details for the application, if the application has not been identified.

9. The method according to claim 5, wherein the step of identifying the transactions and parameters of the application generating the packet further comprises steps of:
   a. determining whether the state of an Application Decode State Machine execution is complete;
   b. determining whether streaming of the packet is required;
   c. identifying transactions and parameters of the application using a State Machine Execution Engine; and
   d. determining whether the information in the packet is incomplete for the State Machine Execution Engine.

10. The method according to claim 9, wherein the step of determining whether the state of the Application Decode State Machine execution is complete, further comprises sending a decoded information with the packet.

11. The method according to claim 10, wherein the step of sending the decoded information with the packet further comprises appending the decoded information onto the packet.

12. The method according to claim 10, wherein the step of sending the decoded information with the packet further comprises sending the decoded information as control packets.

13. The method according to claim 9, wherein the step of determining whether streaming of the packet is required, further comprises the steps of:
   a. sending the packet to the Stream Manager if streaming is not required; and
   b. sending the packet to a Stream Layer if streaming is required.

14. The method according to claim 13, wherein the step of sending the packet to a Stream Layer, further comprises steps of:
   a. collating the information distributed over packets, by the Stream Layer; and
   b. sending the collated information to the Stream Manager.

15. The method according to claim 13, wherein the step of sending the packet to the Stream Layer, further comprises steps of:
   a. ordering re-transmitted and out of order packets, by the Stream Layer; and
   b. sending the packets in order to the Stream Manager.

16. The method according to claim 9, wherein the step of identifying the transactions and parameters using the State Machine Execution Engine further comprises steps of:

a. loading the Application Decode State Machine, by the State Machine Execution Engine; and
b. executing the instructions in an Expression Action Table corresponding to the current state of the Application Decode State Machine, by the State Machine Execution Engine.

17. The method according to claim 16, wherein the step of executing the instructions in the Expression Action Table, further comprises the steps of:
  a. informing the Stream Manager, if the information in the packet is incomplete to execute the instructions;
  b. storing details of new session in a Session Correlation Table, if a new session is expected;
  c. updating the Application Decode State Machine based on results of executing the instructions; and
  d. updating a Session Cache Table and an Application Instance Table based on results of executing the instructions.

18. The method according to claim 9, wherein the step of determining whether the information in the packet is incomplete, further comprises steps of:
  a. setting a flag in a Session Cache Table, if the packet information is incomplete; and
  b. sending packet to the Stream Layer, if the packet information is incomplete.

19. A system for decoding the packet streams of computer networks and identifying applications generating the packet streams, the system comprising:
  a. a plurality of static data stores containing instructions for decoding a packet to identify the application, transactions and parameters;
  b. a plurality of dynamic data stores for maintaining information related to the current state of the decode process, wherein said plurality of dynamic stores further comprise:
    i) a Session Cache Table that contains information regarding the currently active sessions;
    ii) an Application Instance Table that contains information regarding the current state of the decode process for the currently active applications; and
    iii) a Session Correlation Table that maintains information regarding news sessions that are related to currently active sessions;
  c. a means for receiving packets and for identifying the session to which the packets belong; and
  d. a means for decoding transactions and parameters of the application and for sending the decoded information with the packet out of the system.

* * * * *